United States Patent [19]
Szarkowski et al.

[11] Patent Number: 5,348,139
[45] Date of Patent: Sep. 20, 1994

[54] COUNTER-BALANCED PRESSURE SENSOR FOR CONVEYOR ACCUMULATION ZONE

[75] Inventors: Stephen D. Szarkowski; Steven K. Beeny; Arthur D. May, all of Wichita, Kans.

[73] Assignee: Uniflo Conveyor, Inc., Wichita, Kans.

[21] Appl. No.: 960,718

[22] Filed: Oct. 14, 1992

[51] Int. Cl.$^5$ .................................. B65G 13/06
[52] U.S. Cl. ........................ 198/781; 198/790
[58] Field of Search ........................ 198/781, 790

[56] References Cited

U.S. PATENT DOCUMENTS

| | | | |
|---|---|---|---|
| 3,527,338 | 9/1967 | Mita | 198/718 |
| 3,724,642 | 4/1973 | DeGood | 198/781 |
| 3,760,932 | 9/1973 | Schneider | 198/781 |
| 3,768,630 | 10/1973 | Inwood et al. | 198/781 |
| 3,770,102 | 11/1973 | DeGood | 198/781 |
| 3,960,262 | 6/1976 | Henig | 198/781 X |
| 3,967,718 | 7/1976 | Monahan | 198/790 X |
| 4,172,519 | 10/1979 | Leach | 198/781 |
| 4,204,593 | 5/1980 | Leach | 198/781 |
| 4,212,385 | 7/1980 | Leach | 198/781 |
| 4,223,780 | 9/1980 | Saur | 198/781 |
| 4,301,914 | 11/1981 | Krammer | 198/790 X |
| 4,362,238 | 12/1982 | Rivette | 198/781 |
| 4,411,355 | 10/1983 | Furletter et al. | 198/718 |
| 4,417,653 | 11/1983 | Zwezerynen | 198/718 |
| 4,484,676 | 11/1984 | Plumridge et al. | 198/718 |
| 4,524,862 | 6/1985 | Leach | 198/781 |
| 4,858,747 | 8/1989 | Eunson | 198/718 |
| 5,005,693 | 4/1991 | Fultz et al. | 198/790 X |
| 5,052,546 | 10/1991 | Langen et al. | 198/718 |
| 5,115,907 | 5/1992 | Pomara, Jr. | 198/718 X |

*Primary Examiner*—Cheryl L. Gastineau
*Attorney, Agent, or Firm*—Litman, McMahon & Brown

[57] ABSTRACT

A counter-balanced pressure sensor for sensing a package carried by a belt-driven carrying roller conveyor includes a pivot support with a sensing roller attached. The sensing roller is deflected downward by the passage of the package on the conveyor, causing the pivot support to pivot downward, causing a feeler arm attached to the pivot support to contact a sensitive whisker valve mounted beneath the conveyor top surface. The conveyor includes a plurality of zones, all but one of which has one of the pressure sensors. When the pressure sensors in one or more succeeding zones detect the presence of a package in each of their associated zones, the belt drive in a preceding zone is disconnected from the rollers in that zone, putting the preceding zone into an accumulation mode. Each pressure sensor is sensitivity adjustable by adjusting a threaded connector for a counter balance positioned opposite the sensing roller on the pivot support. The pressure sensors are interchangeable with any of the conveyor carrying rollers so they can be positioned at any desired point along the conveyor.

33 Claims, 4 Drawing Sheets

Fig.12.

COUNTER-BALANCED PRESSURE SENSOR FOR CONVEYOR ACCUMULATION ZONE

BACKGROUND OF THE INVENTION

1. Field of the Invention

The present invention relates to a pressure sensor for sensing the presence of one or more packages on a belt-driven roller conveyor, and in particular to such a sensor which can be adjusted to detect extremely light weight packages such as empty paperboard boxes. A plurality of such pressure sensors control a like plurality of pneumatic cylinders, causing them to disengage the conveyor drive in individual respective conveyor zones in response to detection of such packages in one or more succeeding zones to place the associated zone in an accumulation mode.

2. Description of the Related Art

In power driven conveyors, it is frequently necessary to temporarily disconnect the driving mechanism from the conveyor to allow accumulation of conveyed packages. For example, in a belt-driven roller conveyor, such as is used for conveying paperboard boxes in an assembly or loading station, for example, it is often necessary to raise or lower a case stop to halt the motion of a box on the conveyor while it is being loaded. In such an instance, it is desirable to allow a number of boxes to accumulate behind the box being loaded. It is common to use some type of pressure sensor which detects the presence of one or more of the boxes, and which disengages a drive mechanism from the conveyor rollers in response to such a detection.

Prior art conveyor pressure sensors have tended to be spring loaded and, consequently, to have very restrictive threshold weight limitations. For example, it is common in the prior art for such pressure sensors to require a package to weigh 2 or more pounds before the sensor will reliably respond. Such sensors are not suitable for a conveyor where empty paperboard boxes or other very light weight packages, such as envelopes or trays, must be accumulated.

It is clear then, that an improved apparatus and method for sensing and accumulating light weight packages on a beltdriven roller conveyor is needed. Such an apparatus should be compact and inexpensive, extremely rugged, should reliably sense light weight packages on the conveyor but should not be subject to inadvertent tripping. For versatility, such a sensor should preferably have a sensitivity adjustment to allow the sensor to respond to a range of threshold package weights.

SUMMARY OF THE INVENTION

In the practice of the present invention, a conveyor includes a plurality of free wheeling carrying rollers which are selectively driven by an endless belt which extends beneath the rollers. The conveyor is divided into a plurality of zones, each of which has a plurality of such carrying rollers. Beneath the carrying rollers in each zone, and beneath the endless belt as well, are a plurality of corresponding separate friction drives, each of which includes a plurality of friction or "skate" rollers. Each friction drive is selectively pivotable, via a connected telescoping rod of a pneumatic cylinder, between a lowered, non-engaged position, and a raised, engaged position. The friction drive is placed in the raised position when the pneumatic cylinder is pressurized and the telescoping rod extended. In this position, the friction drive pushes the belt into contact with the carrying rollers in that zone, thus driving them via the belt. The friction drive is placed in the lowered position when air pressure to the pneumatic cylinder is removed, and the belt is thus retracted, disengaging the carrying rollers in that zone and placing the zone in an accumulation mode.

The conveyor zones include an infeed or charge zone, one or more intermediate zones, and a discharge zone. Each zone except the charge zone includes a counter-balanced pressure sensor which has a sensing roller which is biased to extend just above the top level of the carrying rollers. Each sensing roller is attached to a pivot support which is pivotable about a short carrying roller. The short carrying roller, with the pressure sensor attached, is interchangeable with any of the carrying rollers on the conveyor, thus allowing it to be positioned at any desired point along the conveyor. Any package traversing the conveyor contacts the pressure sensing roller which then causes the pivot support to pivot downward about the short carrying roller. In turn, a feeler arm mounted on the pivot support contacts a spring actuator in a pneumatic whisker valve, opening the valve. The whisker valve, in turn, is connected to a normally open limit valve, which closes in response to sensing the drop in pressure of the opened whisker valve.

Each pneumatic cylinder is connected to an air source via one or more of the limit valves. When each of the connected limit valves is closed due to the respective pressure sensors detecting a package in their conveyor zones, air pressure within the cylinder is released and the connected friction drive is lowered, thus disengaging the drive belt from the carrying rollers in the associated conveyor zone, and allowing packages to accumulate on the conveyor.

The counter balance on each pressure roller is threadably adjustable to provide a threshold weight sensitivity adjustment for the pressure sensors. The threshold weight can be as small as 2 ounces.

The drawings constitute a part of this specification and include exemplary embodiments of the present invention and illustrate various objects and features thereof.

OBJECTS AND ADVANTAGES OF THE INVENTION

The principle objects and advantages of the present invention include: providing a counter-balanced pressure sensor apparatus and method for sensing packages in a belt-driven roller conveyor zone; providing such an apparatus in which a sensing roller attached to a pivot support is biased to lie just above the plane of the conveyor carrying rollers; to provide such an apparatus in which the pivot support pivots about a short carrying roller which lies in the same plane as the carrying rollers; to provide such an apparatus in which the pivot support includes an adjustable counter balance opposite the sensing roller; to provide such an apparatus in which a package traversing the conveyor will encounter the sensing roller and force it to pivot about the short carrying roller, causing a feeler arm on the pivot support to contact a spring actuator on a normally closed whisker valve; to provide such an apparatus in which the whisker valve opens in response to the spring actuator, thus closing a connected, normally open limit valve, causing a connected pneumatic cylinder to retract a belt friction drive, placing a plurality of carrying rollers into an accumulation mode; to provide such an apparatus in which the conveyor includes a plurality of zones, each of which can be placed into an accumulation mode by one or more pressure sensors; to provide such an apparatus in which each zone includes a pneumatic sensor which is connected to a compressed air source via one or more of the limit valves so that, when the connected limit valve(s) are closed, the cylinder is discharged, retracting a telescoping rod and withdrawing the friction drive from contact with the 14 belt in the associated zone; providing such an apparatus and method in which the presence of virtually any package, regardless of weight, including an empty box or envelope, can be sensed by the sensing rollers; and providing such an apparatus and method which is particularly well adapted for its intended use.

Other objects and advantages of this invention will become apparent from the following description taken in conjunction with the accompanying drawings wherein are set forth, by way of illustration and example, certain embodiments of this invention.

DETAILED DESCRIPTION OF THE PREFERRED EMBODIMENTS

I. Introduction and Environment

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting For example, the words "upwardly" "downwardly" "rightwardly" and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Figure 1:
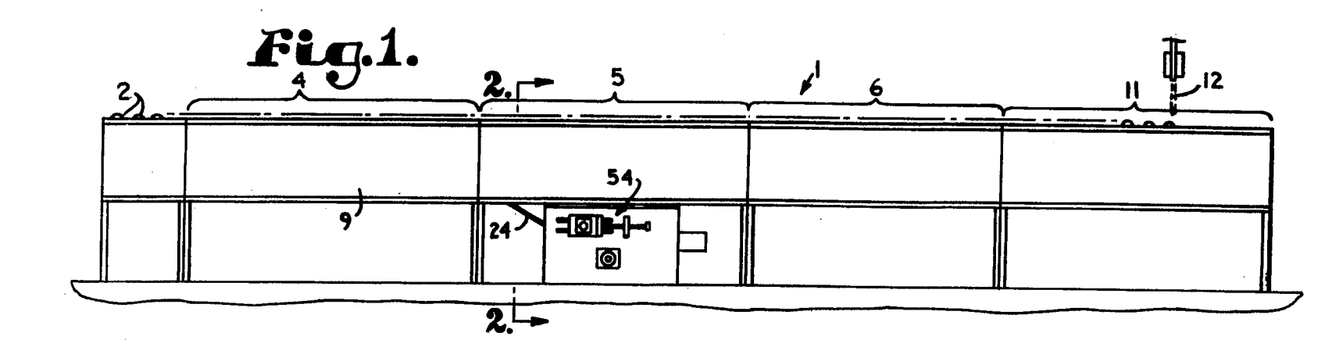
FIG. 1 is a side elevational schematic view of a zoned accumulating conveyor incorporating a plurality of counter-balanced pressure sensors in accordance with the present invention.
Figures 4, 5, 6, 7:
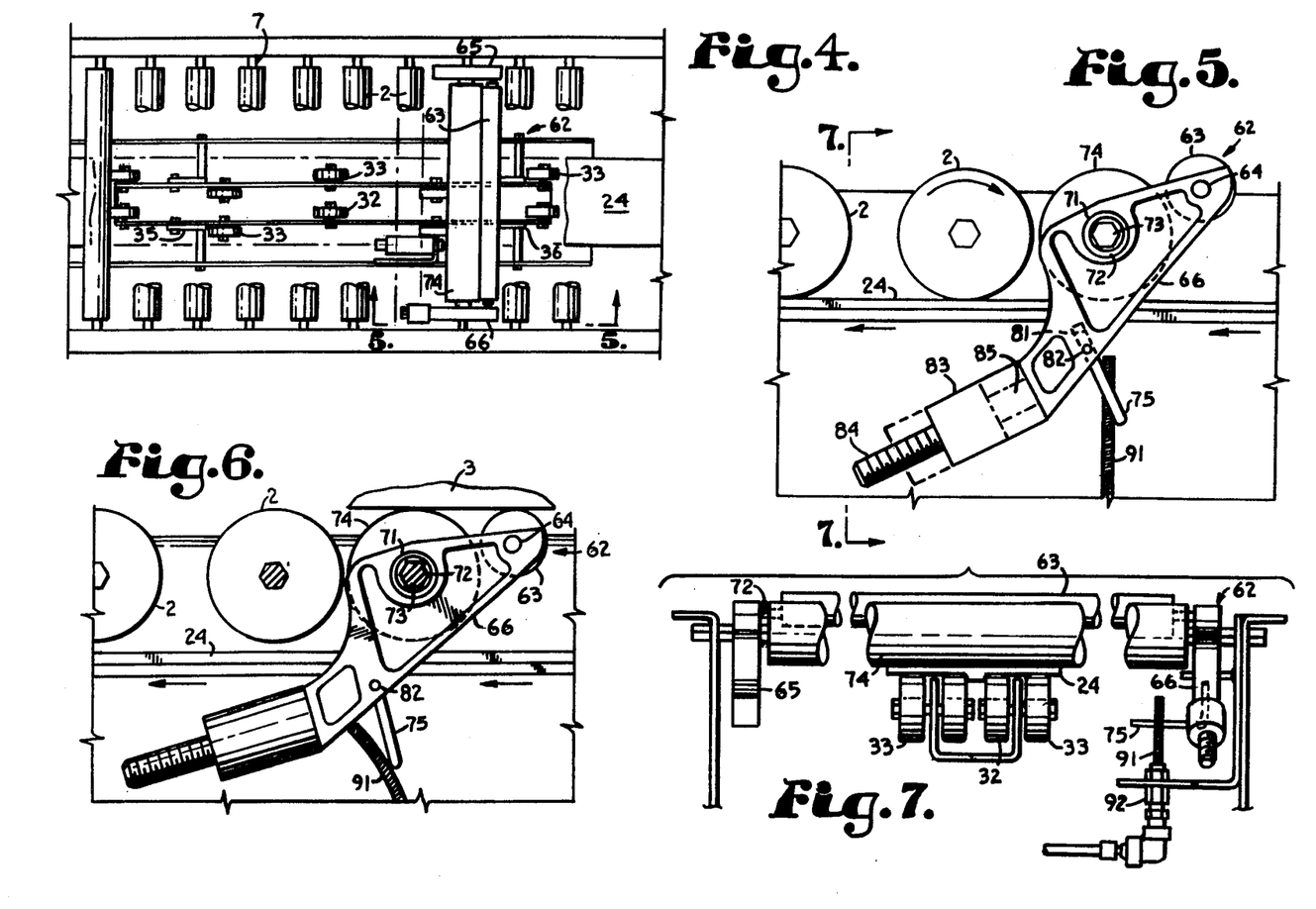
FIG. 4 is an enlarged and fragmentary top plan view with portions of the carrying rollers broken away to illustrate the interior of the conveyor.
FIG. 5 is an enlarged cross-sectional view of a sensing roller and pivot support, taken along line 5—5 of FIG. 4, and illustrating the sensing roller in a normal or upright position.
FIG. 6 is an enlarged cross-sectional view of a sensing roller and pivot support, also taken along line 5—5 of FIG. 4, and illustrating the sensing roller being pivoted downward by contact with a package on the conveyor.
FIG. 7 is an enlarged cross-sectional view of a sensing roller and pivot support, taken along line 7—7 of FIG. 5, and illustrating skate rollers urging the drive belt into contact with the carrying rollers.
Figure 8:
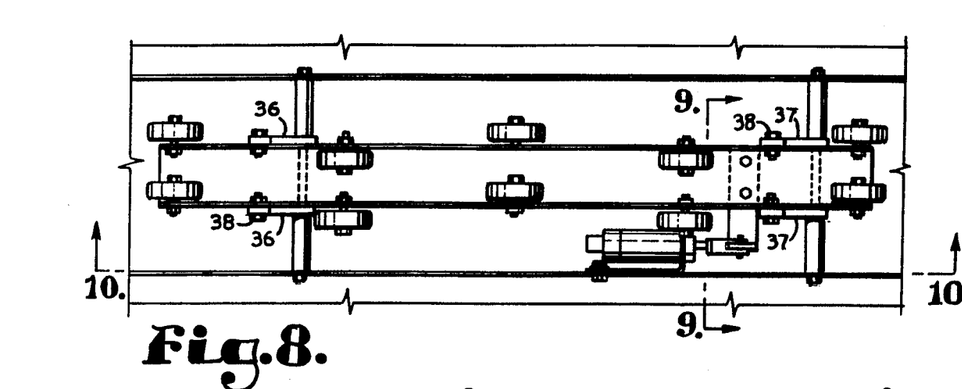
FIG. 8 is an enlarged cross-sectional view of a friction drive assembly with an attached pneumatic cylinder and pivot arm, taken along line 8—8 of FIG. 3.
Figure 9:
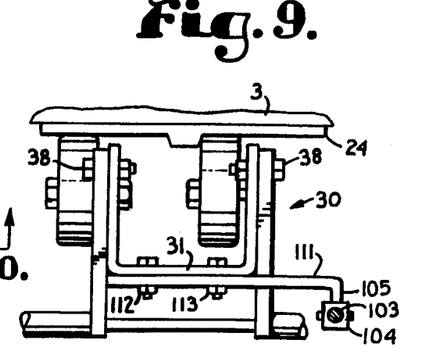
FIG. 9 is an enlarged cross-sectional view of a friction drive assembly with the skate wheels contacting the drive belt and urging it into contact with the carrying rollers, taken along line 9—9 of FIG. 8.

Referring to the drawings in more detail the reference numeral 1 generally designates a belt driven conveyor which includes a plurality of carrying rollers 2 along the top thereof, each of which is freely rotatable about a hexagonal shaft 7 which extends between a pair of side rails 8 and 9. The conveyor 1 is divided into a plurality of zones, of which four are illustrated in FIG. 1. Packages to be conveyed, such as the package 3, partially shown in FIG. 6, are loaded onto the conveyor 1 via an infeed or charge zone 4, which is the leftmost zone in FIG. 1. Zone 5 is a drive zone and zone 6 is an intermediate zone, of which there can be any number depending upon the length of the conveyor 1. Finally, a discharge zone 11, the rightmost zone in FIG. 1, is where the conveyed packages 3 are discharged. A retractable case stop 12 is located near the end of the discharge zone 11. The case stop 12 is lowered to stop the packages 3 from exiting the conveyor 1. In such an instance, the conveyor 1 must be placed into an accumulation mode, i.e. the carrying rollers 2 must be idled.

Figures 2, 3:
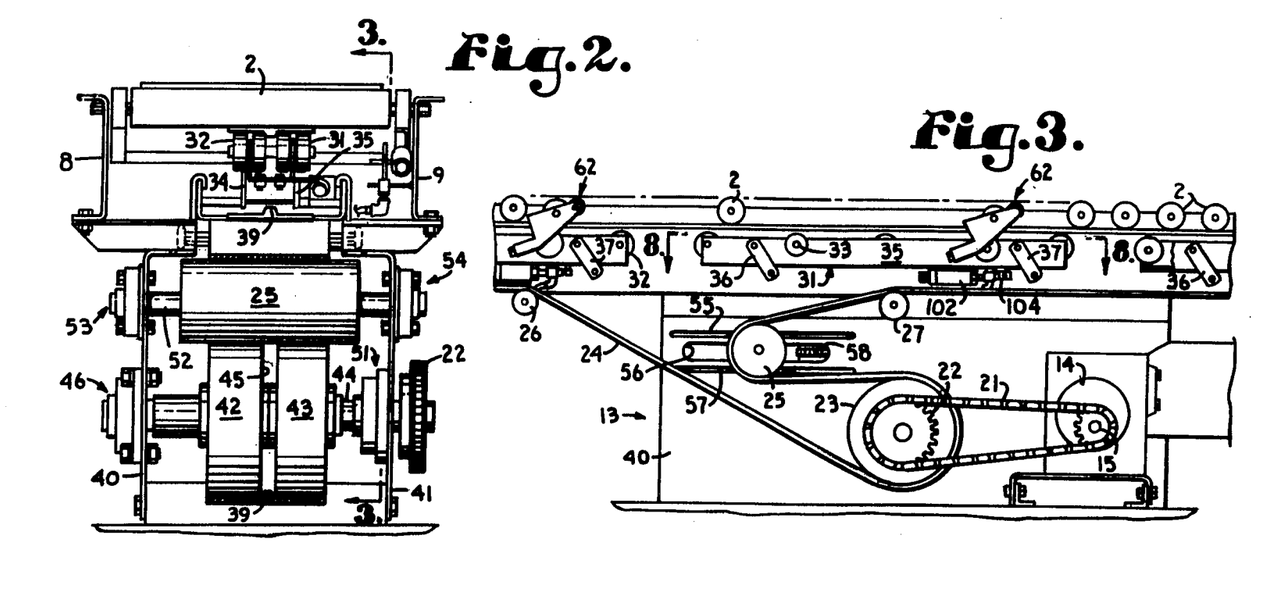
FIG. 2 is an enlarged cross-sectional view, taken along line 2—2 of FIG. 1, and illustrating a counter-balanced pressure sensing roller and pivot support.
FIG. 3 is an enlarged cross-sectional view taken along line 3—3 of FIG. 2, and illustrating the belt drive for the conveyor.
Figure 10:
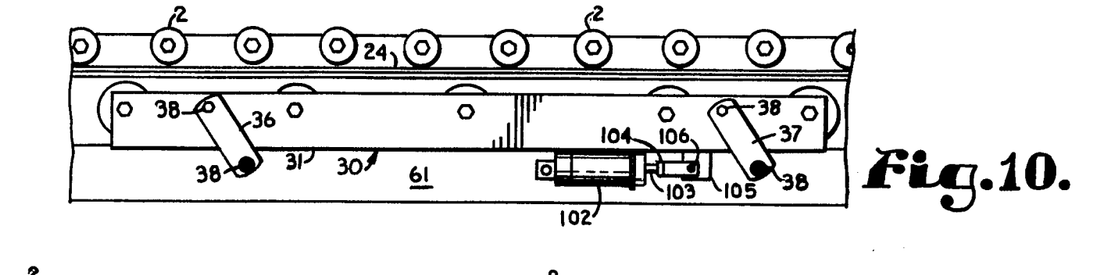
FIG. 10 is an enlarged cross-sectional view of a friction drive assembly with the skate wheels retracted away from the drive belt, taken along line 10—10 of FIG. 8.
Figure 11:
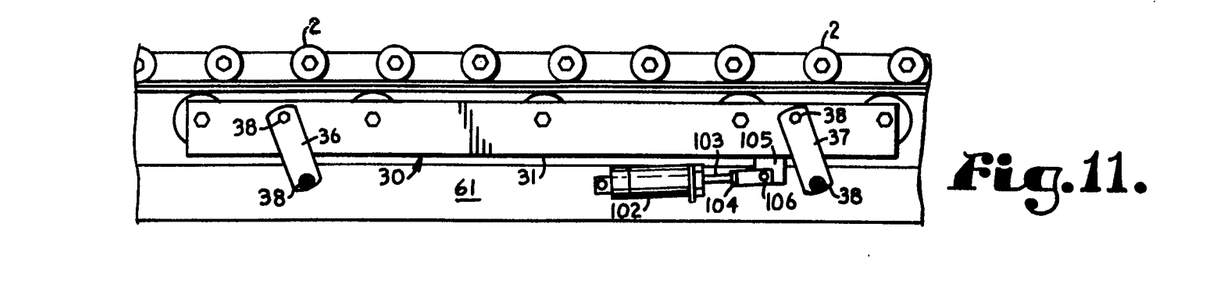
FIG. 11 is an enlarged cross-sectional view of a friction drive assembly with the skate wheels contacting the drive belt and urging it into contact with the carrying rollers, also taken along line 10—10 of FIG. 8.

Referring to FIGS. 2 and 3, a drive assembly 13 for the carrying rollers 2 is illustrated. The drive assembly 13 comprises a motor 14 with an attached motor sprocket 15. A chain 21 is connected from the sprocket 15 to drive a drive sprocket 22. The drive sprocket 22, in turn drives a drive roller 23. An endless belt 24 encircles the roller 23, is fed through a spring loaded and adjustable idler roller 25, and a series of guide rollers, of which rollers 26 and 27 are illustrated in FIG. 3, thence to each end of the conveyor 1. The belt 24 then loops through each of the four conveyor zones 4–6 and 11, running between friction drive assemblies 30, of which there is one in each of the conveyor zones 4–6 and 11, and the carrying rollers 2. Each friction drive assembly 30 includes a plurality of skate rollers 32, which are free wheeling about shafts 33. Each friction drive assembly 30 comprises a "U" shaped channel which includes a pair of side plates 34 and 35 connected by a bottom plate 30 with the tops of the skate rollers 32 extending above the side plates 34 and 35. The side plates 34 and 35 are attached to two pair of pivot arms, 36 and 37 via a plurality of bolts 38. The pivot arm pairs 36 and 37 extend between the plates 34 and 35 and a belt return pan 61, described below, to which they are also attached by bolts 38. The friction drive assembly 30 can thus be pivoted between a raised, belt engaging position, as shown in FIG. 11, and a lowered, belt releasing position, as shown in FIG. 10. In the raised position for the friction drive 14 assembly 30, the skate rollers 32 urge the belt 24 into contact with the carrying rollers 2, causing the moving belt 24, which is moving leftwardly in FIGS. 10 and 11, to drive the carrying rollers 2 in a clockwise rotation. The driven carrying rollers 2 thus impart a rightward motion to any packages 3 placed on top of the conveyor 1. When the friction drive assembly 30 is in the lowered position, the skate rollers 32 are withdrawn from contact with the belt 24, as shown in FIG. 10, and the associated conveyor zone is placed into an accumulating mode, as described below. As illustrated in FIG. 2, the skate rollers 32 are arrayed in rows of two, with each successive row staggered to either side of the plates 34 and 35, and the belt 24 has a centrally located "V" protrusion 39 which extends between the inside skate rollers 32, and which acts to guide the belt 24, preventing it from slipping side-to-side.

Referring to FIG. 2, the drive roller 23 and the idler roller 25 are mounted between a pair of drive support plates 40 and 41. The drive roller 23 actually comprises a pair of roller wheels 42 and 43 which are attached to a shaft 44. The roller wheels 42 and 43 are spaced apart, leaving a gap 45 therebetween. The V protrusion 39 on the belt 24 fits within the gap 45. The shaft 44 is attached to the support plate 40 via a bearing assembly 46, which allows the shaft 44 to freely rotate. The shaft 44 is attached to the drive sprocket 22 at the other end thereof, and is attached to the support plate 42 via a bearing assembly 51. The idler roller 25 is attached to a shaft 52, which is, in turn, attached to the support plates 40 and 41 by a pair of bearing assemblies 53 and 54, respectively. The shaft 52 and the bearing assemblies 53 and 54 are adjustable along slots 55, 56 and 57, as best illustrated in FIG. 3, formed in the support plates 40 and 41. This provides a belt tension adjustment, which can be gauged via a scale 58. The belt 24 extends from the idler roller 25 over the guide roller 27, and to the right in FIG. 3. The belt 24 returns via the belt return pan 61, thence over the guide roller 26 and to the drive roller 23. Other than the V protrusion 39 in the belt 24 and the return pan 61, no other belt guiding mechanism is needed.

II. Pressure Sensor Assembly

A pressure sensor assembly 62 is positioned within each of the conveyor zones 5, 6, and 11, with only the charge zone 4 excepted. Each of the pressure sensor assemblies 62 are identical and only one is illustrated in FIGS. 4-7.

Referring to FIGS. 4-7, each sensor assembly 62 comprises a sensing roller 63 which is freely rotatable about a shaft 64. The shaft 64 extends between opposite end plates 65 and 66, each of which includes a circular bore 71 therethrough for accommodating a cylindrical sleeve 72 which extends around a hexagonal shaft 73 of a short carrying roller 74. The short carrying roller 74 is identical to the carrying rollers 2, except for the shortened length. The relative lengths of the short carrying roller 74 and the carrying rollers 2 are illustrated in FIG. 4. The end plates 65 and 66 are pivotable about the sleeves 72. A feeler arm 75 is rigidly attached to the end plate 66 via a bore 81 and a set screw 82. A counter balance 83 is threadably attached to a threaded shaft 84, which is, in turn, inserted into a bore 85 in the end plate 66. The counter balance 83 can be adjusted toward or away from the end plate 66 by turning it relative to the shaft 84. This adjusts the moment arm of the counter balance 83 and, therefore the threshold weight which is required to pivot the sensing roller 63 downward. The sensor assembly 62 can be adjusted to respond to a package weighing as little as 2 ounces. It should be noted that the hexagonal shaft 73 is interchangeable with any of the shafts 7 of the carrying rollers 2, and thus each pressure sensor assembly 62 can be positioned at any desired point along the top of the conveyor 1.

III. Pneumatic Accumulation Actuator

Referring to FIGS. 5-12, each feeler arm 75 in a pressure sensor assembly 62 is positioned closely adjacent to a spring actuator 91 for a whisker valve 92. The spring actuators 91 are extremely sensitive, with a small displacement of the spring 91 opening the whisker valve 92.

Figure 12:
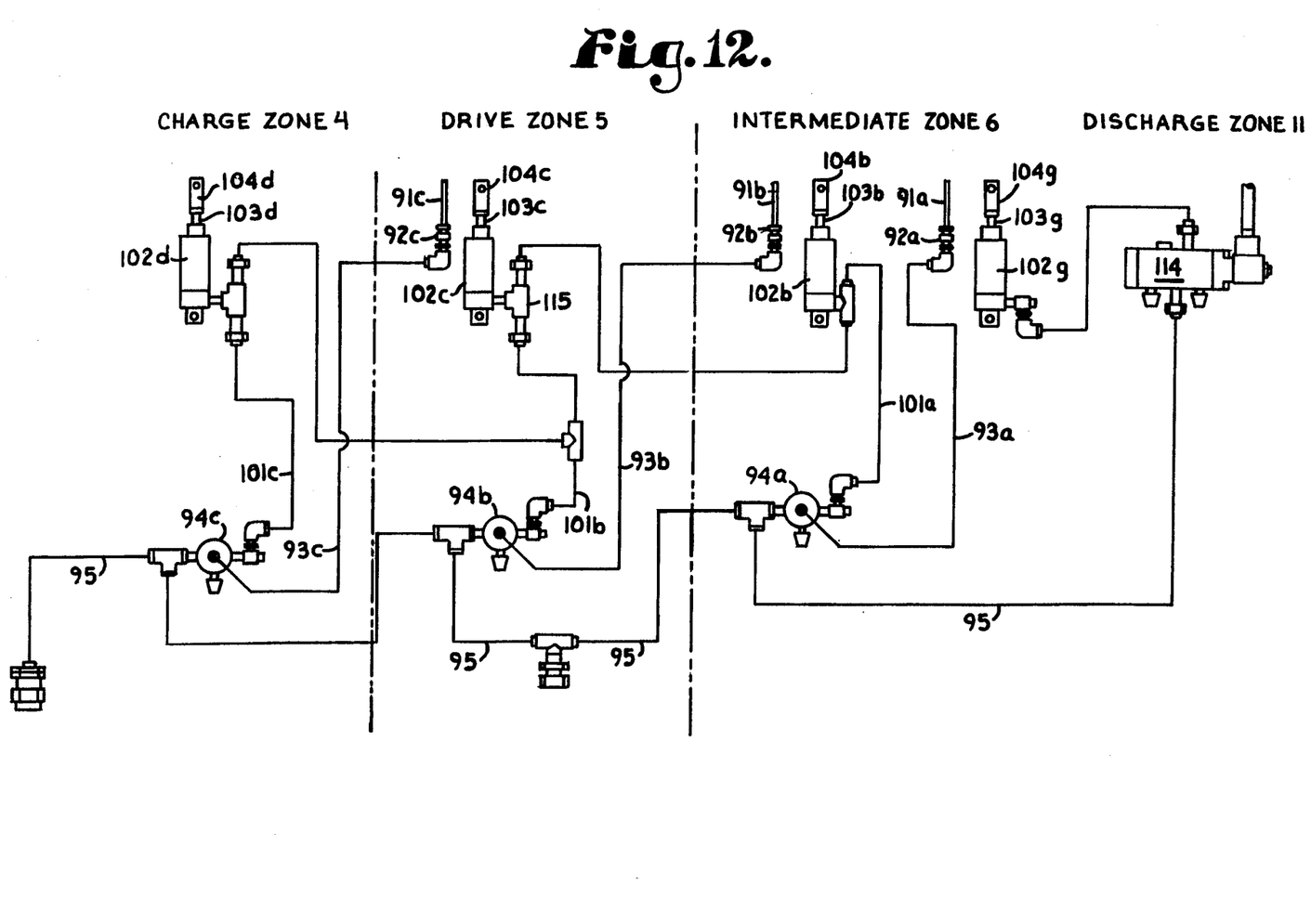
FIG. 12 is a schematic diagram illustrating the pneumatic supply lines and valves for controlling the pneumatic cylinders in the conveyor.

Referring to FIG. 12, a pneumatic schematic is illustrated. Each whisker valve 92a-c is connected via a low pressure air hose 93a-c to a limit valve 94a-c. Each limit valve 94a-c, which is normally open, connects high pressure air from a supply hose 95 to an outlet hose 101a-c. When a limit valve 94a-c senses a pressure drop in the corresponding air hose 93a-c due to the opening of a connected whisker valve 92a-c, it automatically closes, thus disconnecting the corresponding outlet hose 101a-c from the air supply hose 95. Each outlet hose 101a-c is connected to a spring-loaded air cylinder 102a-c, each of which has a telescoping rod 103a-c and a clevis 104a-c attached thereto. When one of the cylinders 102a-c is charged with air via the corresponding outlet hose 101a-c, the associated rod 103a-c is extended against the action of an internal spring (not shown). When the source of air is removed, as by shutting off one or more of the connected limit valves 94a-c, the associated rod 103a-c is retracted by the internal spring.

Referring to FIGS. 8-11, each cylinder 102 is connected to a block 105 via the clevis 104 and a pin 106. The block 105 is connected to an "L" shaped rod 111, which is, in turn, connected to the bottom plate 31 of the friction drive assembly 30 via a pair of bolts 112 and 113. As the rod 103 is extended, the friction drive assembly 30 is pushed to the right, and rotated upward via the pivot arms 36 and 37, as shown in FIG. 11. This urges the skate rollers 32 into contact with the belt 24 and thence into contact with the carrying rollers 2, thus imparting the motions indicated by the arrows in FIG. 5. When the rod 103 is retracted, the friction drive assembly 30 is pulled to the left, and rotated downward via the pivot arms 36 and 37, as shown in FIG. 10. This removes the skate rollers 32 from contact with the belt 24, causing the carrying rollers 2 to return to an idle condition, whereby the associated zone of the conveyor 1 is placed into an accumulation mode.

IV. Operation

The accumulating operation of the conveyor 1 will now be described with reference to FIGS. 1-12. The motor 14 is started, which drives the belt 24 in a counterclockwise direction. High pressure air is supplied to the supply hoses 95 and thence to the cylinders 102a-d via the limit valves 95a-c or a solenoid valve 114, and the outlet hoses 101a–c. The telescoping arms 103 thus urge the friction assemblies 30 rightwardly, forcing the belt 24 into contact with the carrying rollers 2 and causing them to spin clockwise. The packages 3 to be transported along the conveyor 1 from right to left are loaded in the charge zone 4. The packages can be empty boxes, crates, etc.

If it is desired to keep a package 3 in place for loading etc. when it reaches the discharge zone 11, a case stop 12 is either manually or automatically dropped into place above the discharge zone 1, simultaneously activating a solenoid switch 114 (FIG. 12), thus stopping the package 3.

Referring to FIG. 12, this causes the solenoid switch 114 to block air flow from the supply hose 95 to the air cylinder 102a, retracting the rod 103a. Thus, the friction assembly 30 in the discharge zone 11 is retracted, allowing the carrying rollers to idle. Once a second package 3 is backed up by the first blocked package 3, the second package 3 will force the sensing assembly 62 in the discharge zone 11 to rotate downward, causing the feeler arm 75 to contact the spring actuator 91a, thus closing the limit valve 95a and causing the cylinder 102b to retract the rod 103b, and causing the intermediate zone 6 to enter an accumulation mode. Next a third package 3 is backed up within the intermediate zone 6 and forces the sensing assembly 62 in the intermediate zone 6 to rotate downward, causing the feeler arm 75 to contact the spring actuator 91b, thus closing the limit valve 95b and causing the cylinder 102c to retract the rod 103c, and causing the drive zone 5 to enter an accumulation mode. This process is repeated with each succeeding zone from right to left as the packages 3 continue to accumulate. The cylinder 102c is connected to both the air supply hoses 101b and 101c via a shuttle valve 115. With this arrangement, air can be supplied from either hose 101b or 101c, thus providing a fail-safe accumulation, i.e. both the whisker valves 91a and 91b must be opened for the drive zone 5 to enter an accumulation mode. The same fail-safe arrangement is provided for the cylinder 102d, with limit valves 94b and 94c connected thereto. Note that the fact that the sensing assemblies 62 can be freely moved along the conveyor 1 allows the conveyor 1 to be configured for packages of different lengths.

While only 4 zones have been depicted herein for simplicity, it should be understood that any number of intermediate zones 6 can be chained together with a charge zone, a drive zone and a discharge zone to form a conveyor 1 of any desired length. Furthermore, while only one pressure sensor and one friction drive assembly has been illustrated in each zone, each zone can be of any desired length and can include a number of pressure sensor assemblies and corresponding friction drive assemblies.

It is to be understood that while certain forms of the present invention have been illustrated and described herein, it is not to be limited to the specific forms or arrangement of parts described and shown.

What is claimed and desired to be secured by Letters Patent is as follows:

1. A pressure sensing apparatus for sensing an object on a conveyor comprising:
   (a) a two-sided support means which is pivotable about an axis which is positioned below the top surface of said conveyor;
   (b) a first carrying roller rotatable about a shaft suspended between said two sides of said support means;
   (c) a sensor means attached to said support means;
   (d) biasing means for causing said support means to pivot to a position in which said sensor means is positioned just above said top surface of said conveyor, said biasing means comprising a counter balance which is threadably attached to a threaded rod at an opposite end of said support means from said sensor means, said counter balance being longitudinally adjustable along said threaded rod to thereby adjust the sensitivity of said sensor means; and,
   (e) said first carrying roller shaft also provides said pivot axis for said support means.

2. The invention of claim 1, wherein:
   (a) said sensor means comprises a sensing roller rotatable about a shaft which is suspended between said two sides of said support means.

3. The invention of claim 2, wherein:
   (a) said sensing roller is urged downward by said object; whereby
   (b) said support means pivots about said first carrying roller shaft and engages a position sensing means.

4. The invention of claim 3, wherein:
   (a) said pressure sensing means can be adjusted to engage said position sensing means in response to objects weighing less than 2 ounces.

5. The invention of claim 1, wherein:
   (a) said conveyor comprises two opposing side rails and a plurality of second carrying rollers, each of which is rotatable about a shaft which is suspended between said side rails, said conveyor being adapted to convey objects thereon in a direction of conveyance perpendicular to the longitudinal direction of said second carrying roller shafts;
   (b) a drive belt positioned beneath said second carrying rollers, said drive belt being driven in a direction opposite to said direction of conveyance, said belt being selectively urged into contact with said second carrying rollers to rotate said second carrying rollers; and wherein
   (c) said first carrying roller with said support means pivotally attached thereto is interchangeable with any of said second carrying rollers whereby said pressure sensing means can be located at any desired point along said conveyor.

6. A conveyor apparatus, comprising:
   (a) a plurality of zones including a charge zone, at least one intermediate zone, and a discharge zone;
   (b) each said zone except the charge zone including at least one pressure sensing apparatus for sensing the presence of an object on said conveyor apparatus and a position sensing means;
   (c) each said pressure sensing apparatus comprising:
      (i) a support means which is pivotable about an axis which is positioned below the top surface of said conveyor;
      (ii) a sensor means attached to said support means;
      (iii) a counter balance positioned on said support means which counter balance causes said support means to pivot to a position in which said sensor means is positioned just above said top surface of said conveyor, said counter balance being threadably attached to a threaded rod at an opposite end of said support means from said sensor means, said counter balance being longitudinally adjustable along said threaded rod to thereby adjust the sensitivity of said sensor means; and (iv) a first carrying roller which is rotatable about a shaft which is positioned between said two sides of said support means, said first carrying roller shaft also forming the pivot axis for said support means.

7. A conveyor apparatus as in claim 6, wherein:

(a) said conveyor comprises two opposing side rails and a plurality of second carrying rollers, each of which is rotatable about a shaft which is suspended between said two side rails, said conveyor being adapted to convey objects hereon in a direction of conveyance perpendicular to the longitudinal direction of said second carrying roller shafts;

(b) a drive belt positioned beneath said second carrying rollers, said drive belt being driven in a direction opposite to said direction of conveyance, said belt being selectively urged into contact with said second carrying rollers to rotate said second carrying rollers to rotate said second carrying rollers; and wherein (c) each of said first carrying rollers with said support means pivotally attached thereto is interchangeable with any of said second carrying rollers whereby each said pressure sensing apparatus can be located at any desired point along said conveyor.

8. The invention of claim 7, wherein:

(a) at least one belt engaging friction means is positioned within each said zone, each said friction means being movable between a first position in which said belt is urged into contact with said carrying rollers and a second position in which said belt is withdrawn from contact with said carrying rollers; whereby (b) when one of said friction means is in said second position, the associated conveyor zone or zone portion is placed into an accumulation mode.

9. The invention of claim 8, and wherein each conveyor zone further comprises:

(a) positioning means for moving said friction means between said first and said second positions; and (b) the positioning means in each of said zones except said discharge zone being responsive to enabling of the position sensing means in at least the next succeeding zone to move the corresponding friction means into said second position.

10. The invention of claim 9, wherein:

(a) each of said positioning means comprises a pneumatic cylinder with a telescoping rod which is normally retracted but which is extended in response to charging said cylinder with air;

(b) each said telescoping rod being connected to a corresponding one of said friction means such that when said rod is extended, said friction means is placed in said first position, and when said rod is retracted said friction means is placed in said second position;

(c) each of said position sensing means comprising a normally closed whisker valve with a spring actuator which is positioned to be engaged by an arm on the corresponding pressure sensing means when said corresponding pressure sensing means is pivoted downward, thereby opening said whisker valve;

(d) each said whisker valve being connected to a limit valve in the preceding conveyor zone which limit valve is connected between a source of compressed air and the cylinder in one or more preceding zones, each said limit valve being normally open, but closed in response to opening of said whisker valve; whereby (e) compressed air is shut off from said cylinder in response to the engagement of said spring actuator by the pressure sensing means in one or more succeeding conveyor zones.

11. The invention of claim 8, and further comprising:

(a) a drive means for driving said belt; and (b) a belt return pan positioned beneath said friction means for guiding said belt to and from said drive means.

12. A conveyor apparatus as in claim 6, wherein:

(a) each said sensor means comprises a sensing roller rotatable about a shaft which is also suspended between said two sides of said support means.

13. A conveyor apparatus as in claim 12, wherein:

(a) a said object encountering one of said sensing rollers urges it downward, whereby (b) the corresponding support means pivots about its axis and engages a corresponding one of said position sensing means.

14. A belt-driven conveyor apparatus for conveying objects in a first direction, comprising:

(a) a plurality of carrying rollers rotatable about a like plurality of shafts extending from side to side of said conveyor apparatus;

(b) an endless drive belt positioned beneath said carrying rollers, said belt being driven in a direction opposite to said first direction;

(c) at least one belt engaging friction means positioned beneath said belt, each said belt engaging means comprising a friction drive assembly including a plurality of roller means attached to a pair of side plates, said side plates being pivotably attached to said conveyor apparatus via two pairs of pivot arms, each said friction drive assembly including said roller means and said side plates being pivotably movable between a first position in which said belt is urged into contact with said carrying rollers and a second position in which said belt is withdrawn from contact with said carrying rollers, said friction drive assembly pivoting with said pivot arms such that said side plates and said roller means are substantially parallel with said endless drive belt in both said first and said second positions;

(d) at least one pressure sensing means for detecting the presence of an object on said conveyor apparatus; and (e) means for moving said friction means between said first and second positions in response to detection of said object by said pressure sensing means.

15. The invention of claim 14, wherein said pressure sensing means comprises:

(a) a support means which is pivotable about an axis which is positioned below the top surface of said conveyor apparatus;

(b) a sensor means attached to said support means; and (c) biasing means which causes said support means to pivot to a position in which said sensor means is positioned just above said top surface of said conveyor apparatus.

16. The invention of claim 15, wherein:

(a) said biasing means comprises an adjustable counter balance positioned at an opposite end of said support means from said sensor means, whereby said pressure sensing apparatus can be adjusted to respond to packages of differing weights.

17. The invention of claim 16, wherein:
(a) said support means comprises two sides; and
(b) said sensor means comprises a sensing roller rotatable about a shaft which is suspended between said two sides of said support means.

18. The invention of claim 17, wherein:
(a) said sensing roller is urged downward by said object; whereby
(b) said support means pivots about said axis and engages a position sensing means.

19. The invention of claim 18, and further comprising:
(a) a short carrying roller rotatable about a shaft suspended between said two sides of said support means, said short carrying roller shaft also providing said pivot axis for said support means and being interchangeable with any of said carrying roller shafts.

20. The invention of claim 18, wherein:
(a) there are a plurality of said pressure sensing means and a corresponding plurality of said position sensing means;
(b) said conveyor apparatus is divided longitudinally into a plurality of zones including a charge zone, at least one intermediate zone, and a discharge zone; and
(c) each of said zones except said charge zone includes at least one of said pressure sensing means and at least one corresponding position sensing means.

21. The invention of claim 20, wherein:
(a) at least one of said belt engaging friction means is positioned within each said zone; whereby
(b) when one of said friction means is in said second position, the associated conveyor zone or zone portion is placed into an accumulation mode.

22. The invention of claim 20, and wherein each conveyor zone further comprises:
(a) positioning means for moving said friction means between said first and said second positions; and
(b) the positioning means in each of said zones except said discharge zone being responsive to enabling of the position sensing means in at least the next succeeding zone to move the corresponding friction means into said second position.

23. The invention of claim 22, wherein:
(a) each of said positioning means comprises a pneumatic cylinder with a telescoping rod which is normally retracted but which is extended in response to charging said cylinder with air;
(b) each said telescoping rod being connected to a corresponding one of said friction means such that when said rod is extended, said friction means is in said first position, and when said rod is retracted said friction means is in said second position;
(c) each of said position sensing means comprising a normally closed whisker valve with a spring actuator which is positioned to be engaged by an arm on the corresponding pressure sensing means when said corresponding pressure sensing means is pivoted downward, thereby opening said whisker valve;
(d) each said whisker valve being connected to a limit valve in the preceding conveyor zone which limit valve is connected between a source of compressed air and the cylinder in one or more preceding zones, each said limit valve being normally open, but closed in response to opening of said whisker valve; whereby
(e) compressed air is shut of from said cylinder in response to the engagement of said spring actuator by the pressure sensing means in one or more of the succeeding zones.

24. A conveyor apparatus as in claim 14, wherein:
(a) said pressure sensing means is interchangeable with any of said carrying rollers.

25. A belt-driven roller conveyor apparatus divided longitudinally into a plurality of zones including a charge zone, at least one intermediate zone, and a discharge zone, said conveyor apparatus conveying objects in a first direction and comprising:
(a) a plurality of carrying rollers within each zone, each said carrying roller being rotatable about a corresponding shaft extending from side to side of said conveyor apparatus;
(b) an endless drive belt positioned beneath said carrying rollers, said belt being driven in a direction opposite to said first direction;
(c) a belt engaging friction means positioned beneath said belt in each zone, each said friction means being movable between a first position in which said belt is urged into contact with said carrying rollers and a second position in which said belt is withdrawn from contact with said carrying rollers;
(d) a respective pressure sensing means for sensing an object positioned within each zone except the charge zone, each pressure sensing means comprising;
(i) a two-sided support means which is pivotable about an axis which is positioned below the top surface of said conveyor apparatus, said axis being formed by the shaft of a specially adapted one of said carrying rollers;
(ii) a sensing roller rotatable about said carrying roller shaft which sensing roller is suspended between said two sides of said support means; and
(iii) an adjustable counter balance which causes said support means to pivot to a position in which said sensor means is positioned just above said top surface of said conveyor apparatus, said adjustable counter balance, said counter balance being threadably attached to a threaded rod at an opposite end of said support means from said sensor means, said counter balance being longitudinally adjustable along said threaded rot to thereby adjust the sensitivity of said sensor means, whereby said pressure sensing means can be adjusted to respond to objects of differing weights; and
(e) positioning means within each zone for moving a corresponding one of said friction means between said first and said second positions, the positioning means in each of said zones except said discharge zone being responsive to detection of a said object by at least one of said pressure sensing means to move the corresponding friction means to said second position.

26. The invention of claim 25, wherein:
(a) each of said positioning means comprises a pneumatic cylinder with a telescoping rod which is normally retracted but which is extended in response to charging said cylinder with air; and (b) each said telescoping rod being connected to a corresponding one of said friction means such that when said rod is extended, said friction means is placed in said first position, and when said rod is retracted said friction means is placed in said second position.

27. A pressure sensing apparatus for sensing the presence of a object on a conveyor, comprising:
(a) a two-sided support means which is pivotable about an axis which is positioned below the top surface of said conveyor;
(b) a first carrying roller rotatable about a first shaft suspended between said two sides of said support means;
(c) a sensing roller rotatable about a second shaft which is suspended between said two sides of said support means;
(d) an adjustable counter balance means which causes said support means to pivot to a position in which said sensor means is positioned just above said top surface of said conveyor, said adjustable counter balance means being threadably attached to a threaded rod at an opposite end of said support means from said sensing roller and being longitudinally adjustable toward and away from said pivot position along said threaded rod, whereby said pressure sensing mans can be adjusted to respond to objects of differing weights; and
(e) said first carrying roller shaft also provides said pivot axis for said support means.

28. The invention of claim 27, wherein:
(a) said conveyor comprises a plurality of second rotatable conveyor carrying rollers; and
(b) said first carrying roller with said two-sided support means and said sensing roller attached is interchangeable with any of said second carrying rollers.

29. A accumulating conveyor apparatus including a plurality of separate conveyor zones, said apparatus comprising:
(a) a pressure sensing means positioned in at least one of said zones for detecting the presence of an object in said at least one zone, said pressure sensing means including an arm which is positioned for engaging a corresponding spring actuator in response to said presence;
(b) a plurality of carrying rollers in each zone, said carrying rollers being selectively driven by an endless belt;
(d) a belt engaging friction drive means being moveable between a first position in which said belt is urged into contact with said carrying rollers and a second position in which said belt is withdrawn from contact with said carrying rollers whereby when said friction drive means is in said second position, an associated conveyor zone or zone portion is placed into an accumulation mode;
(e) said whisker valve being connected to a means for positioning said friction drive whereby said friction drive is moved to said second position in response to opening of said whisker valve.

30. A conveyor apparatus as in claim 29, wherein said means for positioning comprises:
(a) a pneumatic cylinder with a telescoping rod which is normally retracted but which is extended in response to charging said cylinder with air;
(b) said telescoping rod being connected to said friction means such that, when said rod is extended, said friction means is placed in said first position, and when said rod is retracted, said friction means is placed in said first position;
(c) a limit valve which limit valve is connected between a source of compressed air and said cylinder, each said limit valve being normally open, but closed in response to opening of said whisker valve; whereby
(d) compressed air is shut off from said cylinder in response to the engagement of said spring actuator by the pressure sensing means arm.

31. A conveyor apparatus as in claim 29, wherein comprises:
(a) said belt engaging friction drive means is pivotably connected to said conveyor via two pair of pivot arms, said friction drive assembly pivoting with said pivot arms such that said side plates and said roller means are substantially parallel with said endless drive belt in both said first and said second positions.

32. A pressure sensing apparatus for sensing an object on a belt driven conveyor, comprising:
(a) a movable support means which is attached to said conveyor at a position below the top surface of said conveyor;
(b) sensor means attached to said support means;
(c) weight means attached to said support means which weight means causes said support means to move to a position in which said sensor means is positioned just above said top surface of said conveyor, said weight means being threadably attached to a threaded rod at an opposite end of said support means from said sensor means, said weight means being longitudinally adjustable along said threaded rod to thereby adjust the sensitivity of said sensor means.

33. A conveyor comprising:
(a) a plurality of zones including a charge zone, at least one intermediate zone, and a discharge zone;
(b) each said zone except the charge zone inlcuding at least one pressure sensing apparatus for sensing the presence of an object on said conveyor apparatus and a position sensing means;
(c) each said pressure sensing apparatus comprising:
(i) a support means which is pivotable about an axis which is positioned below the top surface of said conveyor;
(ii) a sensor means attached to said support means;
(iii) a counter balance positioned on said support means which counter balance causes said support means to pivot to a position in which said sensor means is positioned just above said top surface of said conveyor; and
(iv) a first carrying roller which is rotatable about a shaft which is positioned between said two sides of said support means, said first carrying roller shaft also forming the pivot axis for said support means;
(d) a pair of opposing side rails and a plurality of second carrying rollers, each of which is rotatable about a shaft which is suspended between said side rails, said conveyor being adapted to convey objects hereon in a direction of conveyance perpendicular to the longitudinal direction of said second carrying roller shafts;
(e) a drive belt positioned beneath said second carrying rollers, said drive belt being driven in a direction opposite to said direction of conveyance, said belt being selectively urged into contact with said second carrying rollers to rotate said second carrying rollers to rotate said second carrying rollers;

(f) each of said first carrying rollers with said support means pivotally attached thereto being interchangeable with any of said second carrying rollers whereby each said pressure sensing apparatus can be located at any desired point along said conveyor;

(g) at least one belt engaging friction means positioned within each said zone, each said friction means being movable between a first position in which said belt is urged into contact with said carrying rollers and a second position in which said belt is withdrawn from contact with said carrying rollers; whereby when one of said friction means is in said second position, the associated conveyor zone or zone portion is placed into an accumulation mode;

(i) positioning means for moving said friction means between said first and said second positions;

(j) the positioning means in each of said zones except said discharge zone being responsive to enabling of the position sensing means in at least the next succeeding zone to move the corresponding friction means into said second position;

(k) each of said positioning means comprising a pneumatic cylinder with a telescoping rod which is normally retracted but which is extended in response to charging said cylinder with air;

(l) each said telescoping rod being connected to a corresponding one of said friction means such that when said rod is extended, said friction means is placed in said first position, and when said rod is retracted said friction means is placed in said second position;

(m) each of said position sensing means comprising a normally closed whisker valve with a spring actuator which is positioned to be engaged by an arm on the corresponding pressure sensing means when said corresponding pressure sensing means is pivoted downward, thereby opening said whisker valve;

(n) each said whisker valve being connected to a limit valve in the preceding conveyor zone which limit valve is connected between a source of compressed air and the cylinder in one or more preceding zones, each said limit valve being normally open, but closed in response to opening of said whisker valve; whereby (o) compressed air is shut off from said cylinder in response to the engagement of said spring actuator by the pressure sensing means in one or more succeeding conveyor zones.

* * * * *